June 21, 1938.  G. HAGEN  2,121,148

REACTANCE INDEPENDENT OF TEMPERATURE

Filed April 21, 1934

INVENTOR
GERHARD HAGEN
BY
ATTORNEY

Patented June 21, 1938

2,121,148

UNITED STATES PATENT OFFICE 2,121,148

REACTANCE INDEPENDENT OF TEMPERATURE

Gerhard Hagen, Berlin, Germany, assignor to Telefunken Gesellschaft für Drahtlose Telegraphie m. b. H., Berlin, Germany, a corporation of Germany Application April 21, 1934, Serial No. 721,834
In Germany April 21, 1933

1 Claim. (Cl. 175—360)

The present invention relates to self inductances and capacities which are independent of the temperature.

It is known to use as the current conducting circuit elements in oscillatory circuits for short waves, material of a low heat expansion coefficient, whose surface is partially or completely covered with metal. Of particular suitability for this purpose are ceramic materials such as molten quartz and the like.

The invention describes an embodiment of such impedances, which have particular advantages with respect to their manufacture and mechanical durability. In accordance with the invention, as self inductances and capacities, ceramic bodies of hollow shape are used, whose inner surfaces are provided with metallic surface coverings. The advantage afforded by the invention resides in the fact that on the one hand, the ceramic substance assures the independence of the shape of the self inductance from the temperature, while on the other hand, in view of the utilization of conducting metal layers an independence with reference to their mechanical properties, is secured to a wide degree. Thus as conducting layers, metals may be used, for instance, whose ohmic resistance is especially low, such as copper, silver and the like, which however, as regards other properties, such as the capacity to oxidize, have inherent disadvantages. Such metals could not be readily used as outer layers for ceramic bodies, yet this is possible, if they are provided as inner layers in hollow bodies, from which the atmosphere is excluded, or which may be kept within a suitable atmosphere of inert gas in which the metal will not oxidize.

Figure 1:
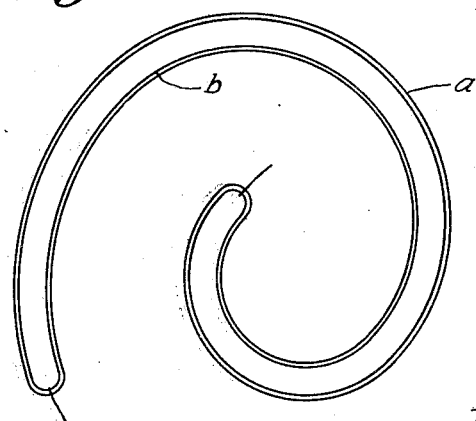
Fig. 1 is a plan view of one embodiment of the invention.
Figure 1A:
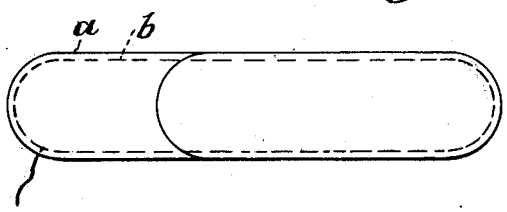
Fig. 1a is a front view of the inductance device of Fig. 1.

Fig. 1 shows a self-induction coil, formed of a ceramic body $a$. The latter is closed and provided with a suitable gas filling of an inert gas. On its inner wall the hollow body is provided with a metallic layer $b$ forming a continuous screw-like covering or spiral of more than one turn.

Figure 2:
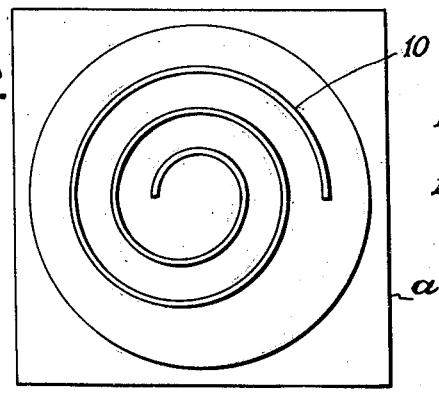
Fig. 2 is a bottom view of the upper casing portion of Fig. 2a with the lower casing section removed.
Figure 2A:
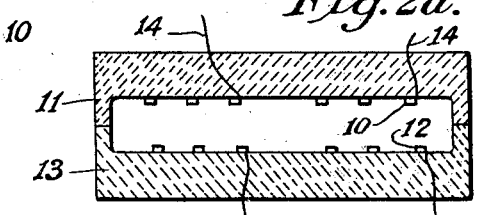
Fig. 2a is a cross section through a transformer embodying the invention taken through the center line of Fig. 2 and, Fig. 3 is a sectional view of a condenser made according to the invention.

Instead of a cylindrical hollow body as shown in Fig. 1, the coil may also be formed of a case or box-shaped hollow body, representing a flat coil in that its inner wall is covered by means of a continuous helical layer. The latter shape is particularly suited for transformers wherein the opposite walls of the hollow body are provided with corresponding coil layers. Such a transformer is shown in Figs. 2 and 2a in which the spiral coil 10 is formed on the bottom of the upper section 11 of the hollow body $a$, and the other transformer coil 12 is formed on the upper surface of the lower section 13 of the ceramic body. Suitable lead wires 14 are provided through the body for the transformer windings. Furthermore, it is possible to use ceramic pipe lines, the interiors of which are provided with a metallized layer of screw or helical shape.

Figure 3:
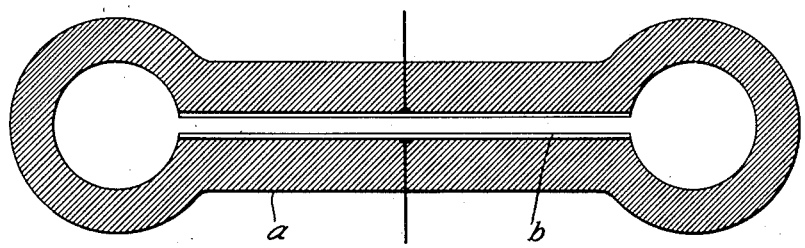

Fig. 3 shows a condenser. This condenser is formed of a hollow body $a$, having on its inner surface the two layers $b$. The layers are produced by coating with metal suitable portions of the inner wall. The input connection is accomplished by means of suitable, welded electrodes 30 which may also be cemented therein.

What I claim is:

An electrical transformer having primary and secondary windings, a pair of cup-shaped cooperating members composed of insulating material and adapted to form a closed chamber having inner surfaces, said primary winding comprising a spirally wound ribbon of conducting material secured on the inner surface of one of said cup-shaped members, said secondary winding comprising a second spirally wound ribbon of conducting material secured on the inner surface of the other of said cup-shaped members, said two windings being in coupling relationship within said chamber, said chamber being filled with an inert gas to thereby prevent oxidization of the conducting material.

GERHARD HAGEN.